US009632165B2

(12) United States Patent
Lim et al.

(10) Patent No.: US 9,632,165 B2
(45) Date of Patent: Apr. 25, 2017

(54) SYSTEM AND METHOD FOR IDENTIFYING AND TRACKING 3D LOCATION OF PRECAST COMPONENTS

(71) Applicant: LC&T Builder (1971) Pte Ltd, Singapore (SG)

(72) Inventors: Lay Meng Lim, Singapore (SG); Meng Fei Lim, Singapore (SG)

(73) Assignee: LC&T BUILDER (1971) PTE LTD, Singapore (SG)

( * ) Notice: Subject to any disclaimer, the term of this patent is extended or adjusted under 35 U.S.C. 154(b) by 359 days.

(21) Appl. No.: 13/915,613

(22) Filed: Jun. 11, 2013

(65) Prior Publication Data
US 2013/0335271 A1 Dec. 19, 2013

(30) Foreign Application Priority Data

Jun. 15, 2012 (SG) .................................. 201204474

(51) Int. Cl.
G01S 3/04 (2006.01)
B66C 13/46 (2006.01)
G01S 19/14 (2010.01)
G01S 19/49 (2010.01)

(52) U.S. Cl.
CPC ................ *G01S 3/04* (2013.01); *B66C 13/46* (2013.01); *G01S 19/14* (2013.01); *G01S 19/49* (2013.01)

(58) Field of Classification Search
CPC ............. G01S 1/68; G01S 19/07; G01S 19/41
USPC .. 342/357.2, 357.24, 357.25, 386, 451, 464; 701/469, 470
See application file for complete search history.

(56) References Cited

U.S. PATENT DOCUMENTS

| 7,344,037 | B1 | 3/2008 | Zakula, Sr. et al. |
| 8,317,244 | B1 * | 11/2012 | Schuyleman ........... B66C 1/105 |
| | | | 294/67.5 |
| 8,978,343 | B1 * | 3/2015 | Sandor ................... B66C 1/666 |
| | | | 414/10 |
| 2005/0242052 | A1 | 11/2005 | O'connor et al. |

(Continued)

FOREIGN PATENT DOCUMENTS

| CN | 201620527 U | 3/2010 |
| EP | 2604569 A1 | 6/2013 |

(Continued)

*Primary Examiner* — Dao Phan
(74) *Attorney, Agent, or Firm* — Wenderoth, Lind & Ponack, L.L.P.

(57) ABSTRACT

A 3-dimensional (3D) precast locating system for identifying and tracking 3D location, that includes ground elevation and geographical location, of a precast, is provided. The system comprises an RFID tag embedded within the precast, a precast lifting machinery having a hook for lifting the precast, wherein a 3D location of the lifting machinery is predetermined as a reference, and an RFID reader attached to the lifting machinery for identifying the precast by operationally reading the RFID tag of the lifted precast. The system further comprises a sensor assembly for detecting an instant 3D location of the hook with reference to the predetermined 3D location of the lifting machinery and a position translational controller for deriving an instant 3D location of the lifted precast based on the 3D location of the hook detected by the sensor assembly, with reference to the predetermined 3D location of the lifting machinery.

22 Claims, 5 Drawing Sheets

(56) References Cited

U.S. PATENT DOCUMENTS

| | | | |
|---|---|---|---|
| 2008/0084333 A1 | 4/2008 | Forrest | |
| 2010/0039319 A1 | 2/2010 | Cameron | |
| 2011/0130862 A1* | 6/2011 | Gao | B66D 3/18 |
| | | | 700/213 |
| 2011/0187548 A1 | 8/2011 | Maynard | |
| 2011/0298232 A1* | 12/2011 | Reger | B66C 1/10 |
| | | | 294/81.5 |
| 2012/0066019 A1 | 3/2012 | Hinshaw et al. | |

FOREIGN PATENT DOCUMENTS

| | | |
|---|---|---|
| JP | 2001080881 A | 3/2001 |
| WO | WO 2011021151 A1 | 2/2011 |
| WO | WO 2013169941 A1 | 11/2013 |

\* cited by examiner

SYSTEM AND METHOD FOR IDENTIFYING AND TRACKING 3D LOCATION OF PRECAST COMPONENTS

FIELD OF THE INVENTION

The present invention relates to precast component management system in a construction project. In particular, the present invention relates to system and method for instantly tracking and identifying position of precast components.

BACKGROUND

Precast components are often used in the construction of civil engineering projects, such as modern high-rise building projects. The precast may be of various size and thickness. The precast components are typically formed at a manufacturing facility, and then transported to the location in which they are to be erected.

The delivery and erection of the precast at the right time and at the right place is very critical to obtain a successful construction project. Failure to locate a precast piece and incorrect erection does have significant impacts in terms of time and money. It is not only delaying the project schedule, but also increasing costs and waste of the project.

Taking these situations into consideration, equipment that can be used to automatically monitor and track delivery and erection process of a precast is being of interest in civil engineering project. Currently, GPS is widely used to identify and track a precast location. The GPS is installed in precast to be erected. However, deploying GPS for precast tracking is not a preferred method due to some disadvantages it may cause. First, installing GPS on every precast is costly and impractical as the size of the GPS is bulky. The GPS also needs external battery to run, yet the battery may not last long enough. Further, the positioning accuracy of the GPS is poor because antenna of the GPS is unable to withstand vibration and shocks frequently experienced in a construction environment. The communication signal of the GPS is also easily obstructed as successive floors are built and raised.

As an alternative to GPS, Differential GPS (DGPS) is deployed for precast tracking. However, the cost of deployment of DGPS is considerably high, and yet, DGPS is unable to overcome communication signal problem caused by high rise or neighboring buildings.

With such problems related to poor performance of available precast tracking systems, a need of equipment that can accurately identify and track location of a precast thus exists.

SUMMARY

One aspect of the present invention provides a 3-dimensional (3D) precast locating system for identifying and tracking 3D location, that includes ground elevation and geographical location, of a precast. The system comprises an RFID tag embedded within the precast, a precast lifting machinery having a hook for lifting the precast, wherein a 3D location of the lifting machinery is predetermined as a reference, an RFID reader attached to the lifting machinery for identifying the precast by operationally reading the RFID tag of the lifted precast, a sensor assembly for detecting an instant 3D location of the hook with reference to the predetermined 3D location of the lifting machinery, and a position translational controller for holding the predetermined 3D location of the lifting machinery, the position translational controller is operable to derive an instant 3D location of the lifted precast based on the 3D location of the hook detected by the sensor assembly, with reference to the predetermined 3D location of the lifting machinery.

In one embodiment of the present invention, the lifting machinery is a tower crane. The tower crane comprises a mast and a horizontal jib, wherein the hook of the lifting machineries is disposed along the length of the horizontal jib, wherein the instant 3D location of the hook is determined based on distance and ground elevation of the hook on the horizontal jib with reference to the mast.

In a further embodiment of the present invention, the horizontal jib of the tower crane is slewable about the mast and the sensor assembly measures slewing angle of the horizontal jib with reference to the mast.

In a further embodiment of the present invention, the horizontal jib of the tower crane is luffable about the mast and the sensor assembly measures luffing angle of the horizontal jib.

In a further embodiment of the present invention, the hook is attached to the horizontal jib by a trolley, wherein the trolley is movably slideable along the horizontal jib, thereby shifting the hook laterally along the horizontal jib.

In another embodiment of the present invention, the mast of the tower crane is fixed on its base to the ground.

In yet another embodiment of the present invention, the tower crane is a traveling tower crane, wherein a boogie having wheels is provided on the base of the traveling tower crane, thereby allowing the tower crane to travel along a track. Rotation of the wheels of the boogie may be used to determine the 3D location of the traveling lifting machinery.

In a further embodiment of the present invention, a differential global positioning system may be installed to the tower crane to determine the 3D location of the traveling lifting machinery.

In yet another embodiment of the present invention, the position translational controller is attached onto top of the lifting machinery.

In a further embodiment, the 3-dimensional (3D) precast locating system further comprises a communication link operable for transmitting the instant 3D location of the lifted precast to a server. When the communication link is out of range of the server, the communication link is operable to transfer instant 3D location of the lifted precast to other communication links more closely connected to the server.

Another aspect of the present invention provides a method for identifying and tracking 3D location that includes ground elevation and geographical location, of precast. The method comprises embedding an RFID tag within the precast, lifting the precast using a precast lifting machinery having a hook, wherein a 3D location of the lifting machinery is predetermined, reading the RFID tag embedded of the lifted precast for identifying the lifted precast, detecting an instant 3D location of the hook with reference to the predetermined 3D location of the lifting machinery; and deriving an instant 3D location of the lifted precast based on the 3D location of the hook with reference to the predetermined 3D location of the lifting machinery. The method of claim 15, may further comprise transmitting the instant 3D location of the lifted precast to a server.

In another further embodiment of the present invention, deriving an instant 3D location of the lifted precast based on the 3D location of the hook with reference to the predetermined 3D location of the lifting machinery further comprises attaching a position translational controller performing the derivation to top part of the lifting machinery.

In a further embodiment of the present invention, the method further comprises storing the instant 3D location and the identity of the lifted precast in a memory provided in the server.

In another further embodiment of the present invention, the method further comprises displaying the instant 3D location and the identity of the lifted precast in a user interface connected to the server.

In still another further embodiment of the present invention, the method further comprises determining the 3D location of the lifting machinery.

BRIEF DESCRIPTION OF THE DRAWINGS

This invention will be described by way of non-limiting embodiments of the present invention, with reference to the accompanying drawings, in which.

DETAILED DESCRIPTION

Figure 1:
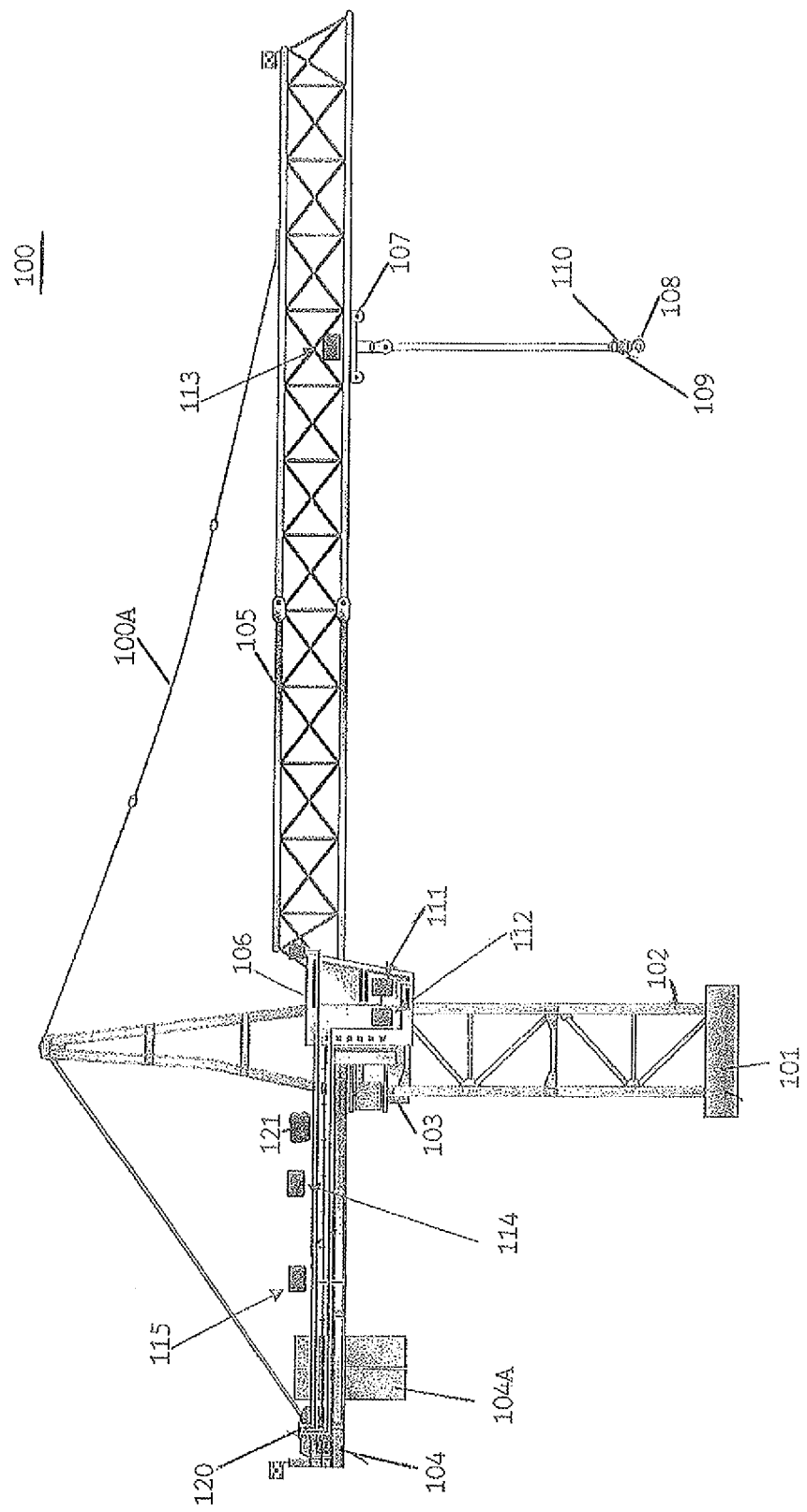
FIG. 1 illustrates a schematic diagram of a system for precast tracking according to one embodiment of the present invention.

The following descriptions of a number of specific and alternative embodiments are provided to understand the inventive features of the present invention. It shall be apparent to one skilled in the art, however that this invention may be practiced without such specific details. Some of the details may not be described in length so as to not obscure the invention. For ease of reference, common reference numerals will be used throughout the figures when referring to same or similar features common to the figures.

The present invention provides a system and method for tracking a precast location within a construction jobsite accurately. The precast location referred herein is a 3-dimensional (3D) precast location that includes ground elevation of the precast and geographical location of the precast. The present invention can be used in, but not limited to, a high-rise building construction project that involves lifting and delivering precast of different sizes and weights. The system comprises a precast lifting machinery used for transporting precast and an RFID tag embedded within the precast. The system makes use the predetermined 3D location of the lifting machinery as a reference for tracking and identifying the precast location.

The precast lifting machinery may include, but not limited to, tower crane. Those skilled in the art will understand that other type of cranes may also be used in the system according to the present invention for transporting precast.

FIG. 1 illustrates a schematic diagram of a system 100 for precast tracking according to one embodiment of the present invention. In the present embodiment, the precast lifting machinery is saddle jib tower crane 100A. The saddle jib tower crane 100A comprises a base 101 fixed to the ground to ensure stability of the tower crane 100A, a mast 102 attached to the base 101, giving the tower crane 100A its height, and a stewing unit 103 attached to the mast 102 which allows the crane 100A to rotate, and a control panel 106 controlling operation of the crane. The control panel has a first hook radio link 111 and a Localized Position Translation Controller (LPTC) 112. The LPTC 112 holds information regarding the predetermined 3D location of the base 101/mast 102, at which the saddle jib tower crane 100A fixed.

In one embodiment, the control panel 106 may be a cabin operator in which a crane operator sits and controls operation of the crane. In another embodiment, the control panel 106 may be remotely controllable by a radio remote control.

The tower crane 100A further comprises a horizontal counter jib 104 attached to the slewing unit 103, wherein the horizontal counter jib 104 carries counterweight 104A, and a horizontal jib 105 pivoted to the mast 102, thereby it can slew circumferentially about the mast to give the tower crane 100A additional lateral movement. The stewing angle of the horizontal jib 105 with reference to the mast 102 is measured and detected by a Slewing Angle Sensor (SAS) 114. The SAS 114 is configured to communicate its measurement data to the LPTC 112. The LPTC 112 will later on be using the measured slewing angle to derive 3D location of the lifted precast.

During precast lifting, the weight imposed by the lifted precast to the horizontal jib 105 is accordingly counterbalanced by the counterweight 104, thus preventing the tower crane 100A from tipping over.

Still referring to FIG. 1, the horizontal jib 105 further has a trolley 107 provided with a hook 108 to lift precast. The hook 108 can be raised up and down to a desired height by a hoisting drum 120 provided at the tower crane 100A. A hook height and weight sensor assembly (HHS) 121 is used to measure the ground elevation of the hook 108 and load state of the hook 108. Load state of the hook corresponds to a state on whether a precast is already being hooked to the hook 108 or not. The HHS 121 is configured to communicate the measured the hook 108 ground elevation and load state of the hook to the LPTC 112. The LPTC 112 will later on be using the measured hook 108 ground elevation to derive ground elevation of the lifted precast.

Apart from lifting purpose, the hook 108 also has an RFID reader 109 for reading information stored in RFID tag embedded within the precast. The RFID reader 109 is interfaced with a second hook radio link 110, which is configured to communicate with the first hook radio link 111 in the control panel 106 the identity of the lifted precast read from the RFID tag.

Still referring to FIG. 1, the trolley 107 is configured to movably slide along the horizontal jib 105, shifting the precast laterally. The trolley 107 is further provided with a Trolley Position Sensor (TPS) 113 operable to measure lateral distance between the trolley 107 and the mast 102, and communicates it to the LPTC 112.

The LPTC 112 processes measurement data received from the SAS, TPS and HHS, translates the data and thus derive 3D location of the lifted precast, i.e., the ground elevation and geographical location thereof. Meanwhile, the LPTC also receives load state of the hook 108 and precast RFID information from the first hook radio link 111, thereby identifying the identity of the lifted precast. The first hook radio link 111 receives the RFID information from the second hook radio link 110.

Upon translation, the LPTC 112 communicates the 3D location and RFID information of the lifted precast to a server radio link 115 attached to the horizontal counter jib 104. The server radio link 115 communicates and transmits the lifted precast identity and 3D location information, to a crane radio link located on a server in a landed office in the jobsite.

In another embodiment, the crane radio link may further be connected to a user interface operable to display the information received by the server radio link so as to inform a user on the identity and 3D location of the precast.

In another further embodiment, the server may comprise a memory for storing the information received by the server radio link accordingly.

In another further embodiment, the server may export the information into other systems for further articulation.

The operation of the system 100 for accurately tracking a precast location within a construction jobsite is described as follows. In the description below, the system is used in a construction project of high-rise building. Those skilled in the art will understand that besides high-rise building project, the system may also be used in many other construction projects.

In a typical construction project of high-rise building, precasts of different sizes and forms are to be vertically erected. The idea is to place a precast on top of a foundation floor such that the precast defines a level of the building, and successively place additional precasts on top of the first precast so as to define successive upper levels. As successive levels are built, precasts must also be accordingly lifted higher. In prior art when GPS is installed on each piece of precast so as to detect the location of the precast, the GPS signal is often blocked by the rising building, rendering the precast tracking ineffective. The system 100 of the present invention is able to overcome this issue effectively.

Precasts to be erected is pre-fabricated in a manufacturing facility. After fabricated, precasts are sent to and kept in a storage. Each precast has an RFID tag embedded there within. The RFID tag stores information retrievable for the purpose of precast identification. The RFID tag may store information such as identification number of the precast, materials and components of the precast, name and telephone number of the manufacturer, etc.

At the construction site, when a particular precast is to be erected, a worker will retrieve storage location of the particular precast from the server. Once the storage location is known, the worker will go to the storage to further verify that the particular precast is the precast of interest. The verification may be done using a RFID reader, by which the worker can scan the RFID tag embedded within the precast to retrieve the identification number of the precast. Upon verification, the precast will be lifted in place for erection by the tower crane 100A of the system 100. The mast 102 of the tower crane 100A is fixed at a predetermined 3D location on its base 101. The LPTC 112 holds information of predetermined 3D location of the mast 102. The predetermined 3D location of the mast 102 of the saddle jib tower crane 100A will later on be used by the LPTC 102 as a reference to instantly identify and track the instant 3D location of the precast within the jobsite.

In order to lift and hoist the precast in place, the precast is hooked to the hook 108 of the tower crane 100A of the system 100. The operation of the tower crane 100A is controlled by the control panel 106. When the precast is being hooked onto the hook 108, the RFID reader 109 attached to the hook 108 read the RFID tag embedded within the precast to once again verify that the correct precast is being hooked. The RFID reader 109 communicates the lifted precast identity information to the second hook radio link 110. The second hook radio link 110 subsequently transmits the information with regard to the identity of the precast to the first hook radio link 111 in the control panel 106. The first hook radio link 111 then communicates this lifted precast identity information to the LPTC 112.

Meanwhile, as soon as the precast is hooked to the hook 108, the hoisting drum 120 starts running to move the hook 108 upwardly so as to lift the precast. The HHS 121 detects the load state of the hook 108 and ground elevation of the hook 108 and communicates the data to the LPTC 112.

At the same time, to precisely position the precast in place, the precast does not only need to be upwardly shifted, but also needs to be laterally shifted. The horizontal jib 105 of the tower crane 100A slews in a certain angle to shift the precast laterally, closer to the intended erection position. As the horizontal jib 105 slews, the slewing angle of the horizontal jib 105 with respect to the mast 102, is detected and recorded by the SAS 114. Moreover, the trolley 107, to which the hook 108 attaches, is also configured to movably slide in or out of the horizontal jib 104 so as to place the precast exactly in place. Similarly, the lateral distance of the trolley 107 with respect to the mast 102 is measured and recorded by the TPS 113.

Once the data of load state and ground elevation of the hook 108, the slewing angle of the horizontal jib 105 and the lateral distance between the trolley 107 and the mast 102 are measured, the data are communicated to the LPTC 112. With reference to the predetermined location of the mast 102, the LPTC 112 translates the data and derives 3D location information of the lifted precast thereby.

Upon 3D location derivation, the LPTC 112 communicates the 3D location information and identity of the lifted precast to the server radio link 115. The server radio link subsequently transmits the information to the crane radio link attached to the server in the landed site office. A worker may view the information from the server so as to identify and track instant location of the precast being lifted.

The system 100 is also applicable during transport of the precast from the manufacturing facility to the storage. Similar to what has been elaborated above, when the tower crane of the system is used to transport the precast from the manufacturing facility to the storage, a worker may obtain precise information regarding the storing status and storing location of the precast. The RFID tag gives information on precast identity and the information is readable by the RFID reader. The localize position translation controller communicating with the TPS, SAS and HHS is made use to track instant 3D location of the precast. By combining this obtainable information, the storing location of the precast can be easily identified. All information is accordingly communicated to the server, from which the worker can retrieve and view the information accordingly.

Figure 1A:
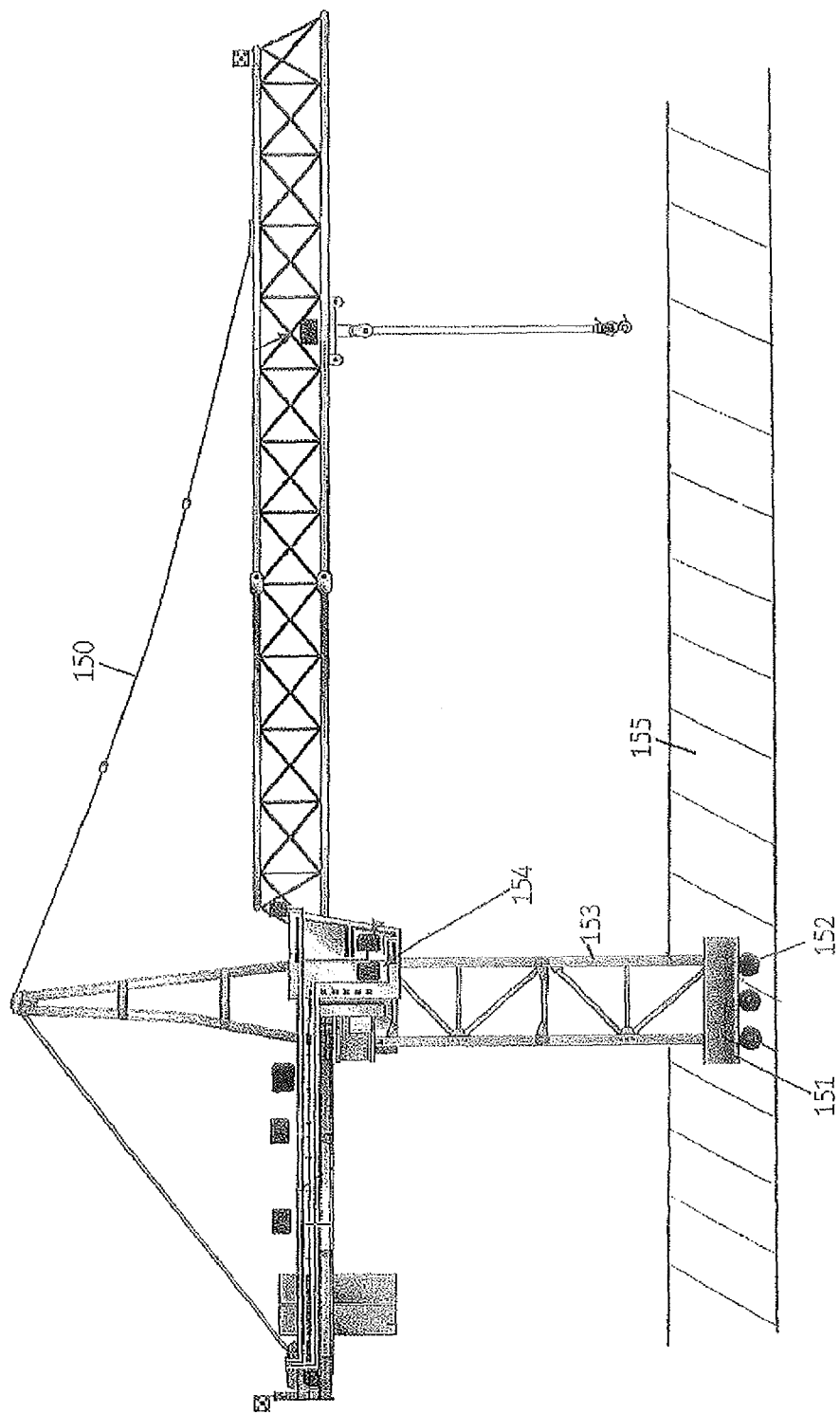
FIG. 1A illustrates a schematic diagram of a system for precast tracking using a traveling saddle jib tower crane in accordance with one embodiment of the present invention.

In another embodiment of the present invention, the saddle jib tower crane may not be fixed at its base, but is configured in such a way that the crane is able to travel along a track. FIG. 1A illustrates a travelling saddle jib tower crane 150. The travelling tower crane 150 comprises a boogie 151 having wheels 152 provided at the base of mast 153, thus enabling the travelling saddle jib tower crane 150 to travel along a track 155. Rotation of the wheels 152 is used to determine instant 3D location of the mast 153 of the tower crane 150. It is preferable in the present embodiment that position of the mast 153 is always known as the 3D location of the mast 153 is used as reference point for tracking and identifying the precast location. The instant 3D location of the mast 153 is communicated to the localized position translation controller (LPTC) 154, which later on will use the 3D location of the mast 153 to derive 3D location of a lifted precast.

In a further embodiment, the traveling crane can also be provided with a traveling position sensor for determining instant 3D location of the mast 153 of the traveling saddle jib tower crane 150.

In yet another further embodiment, differential global positioning system may also be used to determine instant 3D location of the mast 153 of the traveling saddle jib tower crane 150.

Figure 2:
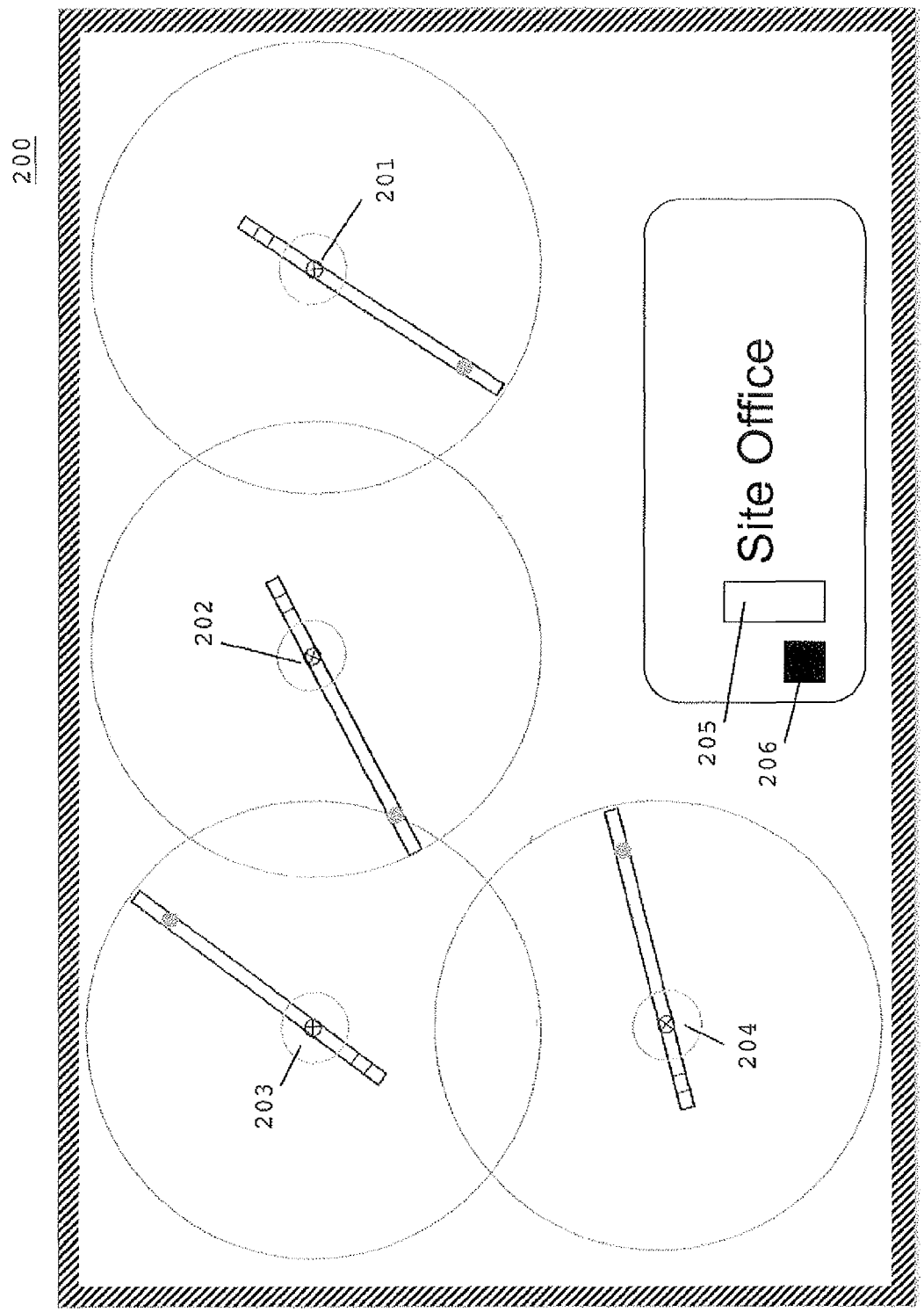
FIG. 2 illustrates a schematic diagram of a construction jobsite deploying plurality of tower cranes in accordance with one embodiment of the present invention.

It is typical that in a construction jobsite, plurality of tower crane is deployed. FIG. 2 illustrates a schematic diagram of a construction jobsite 200 deploying plurality of tower cranes 201, 202, 203, 204 in accordance with one embodiment of the present invention. The plurality of the tower cranes 201, 202, 203, 204 is stretched around the jobsite 200. When the position of one particular tower crane 203 is too far from the server 205 in landed office, the server radio link of that particular tower crane 203 may not be able to communicate with the cranes radio link 206 in the server 205 accordingly. In this event, the server radio link of the particular tower crane will communicates data of their lifted precast to other neighboring tower crane 201, 202 or 204 closer to the server 205. As such, data from any relatively far tower cranes will eventually reach the server 205 through such chain data delivery.

It shall be understood by persons skilled in the art that although the above exemplary embodiment is described with respect to the use of saddle jib tower crane which the horizontal jib is fixed to the mast, any other configurations of lifting machineries may also be used accordingly. The other configurations of lifting machineries may include luffing jib tower cranes, which jib can be tilted accordingly, traveling cranes tower, and many others.

Figure 3:
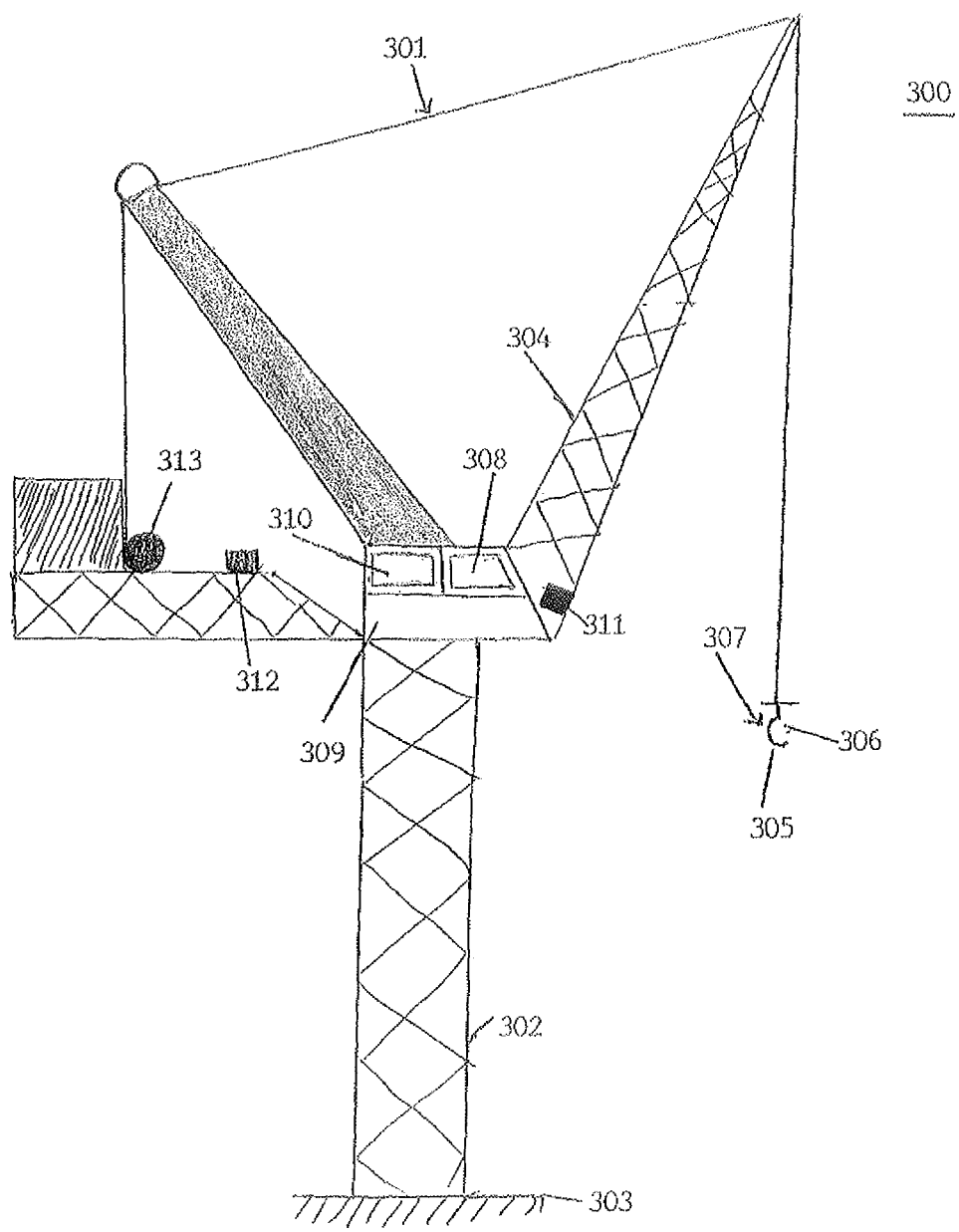
FIG. 3 illustrates a schematic diagram of a system for precast tracking according to another embodiment of the present invention.

FIG. 3 illustrates a schematic diagram of a system 300 for precast tracking according to another embodiment of the present invention. In this present embodiment, the tower crane is luffing jib tower crane 301. Mast 302 of the luffing jib tower crane 301 is fixed to the ground on its base 303 at a predetermined 3D location. Horizontal jib 304 of the luffing jib 301 is hinged to mast 302 that the jib 304 can luff up and down accordingly. Luffing angle of the horizontal jib 304 with respect to the mast 302 is measured by a luffing angle sensor (LAS) 311.

Still referring to FIG. 3, the luffing jib tower crane 301 further comprises a hoisting drum 313 operable to moves hook 305 upward and downward. The hook 305 of the luffing jib tower crane 301 is fixed at the outer end of the horizontal jib 304. A hook height and weight sensor assembly (HHS) 312 interfaced with the hoisting drum detects the load state of the hook 305 as well as ground elevation of the hook 305.

The hook 305 further has a RFID reader 306 and a second hook radio link 307 for reading RFID tag embedded within the precast and communicating the precast data to a first hook radio link 308 in the control panel 309, respectively. The first hook radio link 308 further transmits the data to a localized position translation controller (LPTC) 310 in the control panel 309.

In addition to receiving precast identity information from the first hook radio link 308, the LPTC 310 is also configured to receive measurement data recorded by both the HHS 312 and LAS 311. With reference to the pre-determined 3D location of the mast 302, the LPTC 310 processes the data measured by the HHS and LAS to derive the instant 3D location of the lifted precast.

Operation of the system utilizing luffing jib tower crane 301 to track and identify precast location is described as follows. Identity of the precast read by the RFID reader is transmitted to the first hook radio link and subsequently to the LPTC. Luffing angle of the jib 304 is measured by the LAS 311, and meanwhile, the HHS 312 detects the load state and ground elevation of the hook. The information of the luffing angle as well as the load state and ground elevation of the hook are also communicated with the LPTC 310.

With reference to the known location of the mast 302, the LPTC 310 translates the information of the luffing angle and ground elevation of the hook to meaningful instant 3D location of the lifted precast. The LPTC 310 then transmits the instant 3D location information of the lifted precast as well as identity of the lifted precast received from the first hook radio link to the server radio link. The server radio link will further transmit the information to the cranes radio link attached to the server in the site office. The server may be connected to a user interface, by which a worker can display and articulate the information accordingly.

Figure 3A:
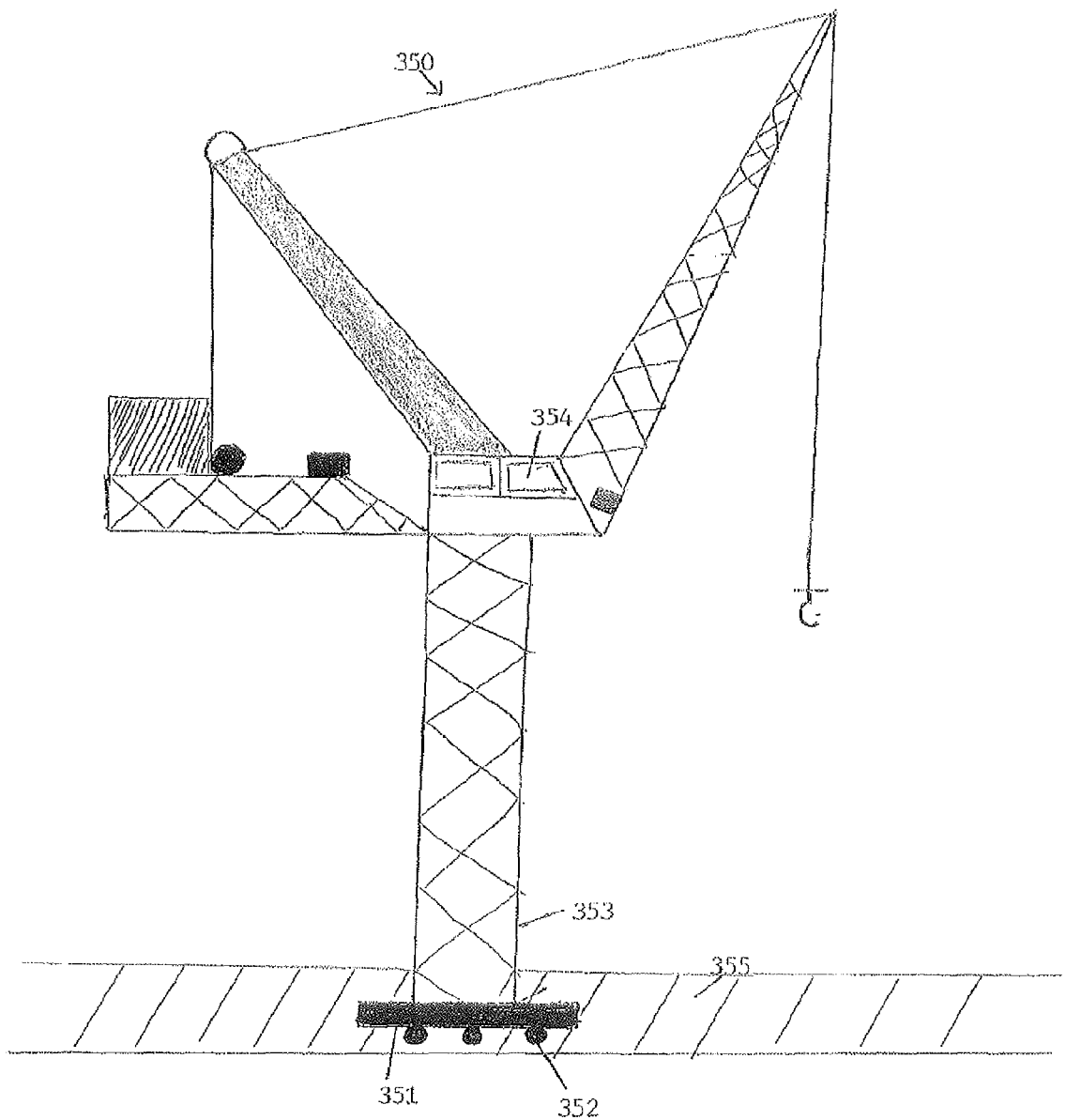
FIG. 3A illustrates a schematic diagram of a system for precast tracking using a traveling luffing jib tower crane in accordance with one embodiment of the present invention.

In another embodiment of the present invention, the luffing jib tower crane may not be fixed at its base, but is configured in such a way that the crane is able to travel along a track. FIG. 3A illustrates a travelling luffing jib tower crane 350. The travelling tower crane 350 comprises a boogie 351 having wheels 352 provided at the base of mast 353, thus enabling the travelling tower crane to travel along a track 355. Rotation of the wheels 352 is used to determine instant 3D location of the mast 353 of the tower crane 350. It is preferable that 3D location of the mast 353 is always known as the 3D location of the mast 353 is used as reference point for tracking and identifying the precast location. The known 3D location of the mast 353 is communicated to the localized position translation controller (LPTC) 354 which will accordingly use the known 3D location of the mast to derive instant 3D location of a lifted precast.

In a further embodiment, the traveling crane may also be provided with a traveling position sensor for determining instant position of the mast 353.

In yet another further embodiment, differential global positioning system may also be used to determine instant position of the mast 353 of the travelling luffing jib tower crane 350.

While all above exemplary embodiments uses known location of the mast of the tower crane as reference point for identifying and tracking 3D location of the precast, it shall be understood that those exemplary embodiments are provided herein so as to illustrate the present invention better and shall not limit the present invention in any way. Any component of the tower crane, which location is predeterminedly known, may be used as reference point so as to identify and track 3D location of the lifted precast.

Some advantages of using the system of the present invention are that the system provides opportunity to uniquely identify each precast with the help of RFID tag embedded therewithin, as well as to precisely locate the precast in real time. With reference to predetermined location of the tower crane, 3-dimensional location of the precast can be easily tracked and identified.

Further to the above, communication pathway of the system of the present invention will not be blocked by the rising building as successive floors are built, or by any other tall neighboring building. As successive floors are built, the tower crane of the system must accordingly be positioned in higher elevation on the building. As such, the server link of the system of the present invention, which is responsible for any data communication regarding the precast, will always sit in position higher than the highest level of the rising building or neighboring building, and it provides an obstruction-free communication pathway to the system of the present invention. This is in contrast to previously known precast tracking system like GPS installed in precast, wherein radio communication of the GPS is prone to obstruction by any tall building. As such, the present invention could substitute the use of bulky and expensive, yet insensitive GPS, or the like, as a device to track and identify position of a precast.

The above description illustrates various embodiments of the present invention along with examples of how aspects of the present invention may be implemented. While specific embodiments have been described and illustrated it is understood that many changes modifications, variations and combinations thereof could be made to the present invention without departing from the scope of the present invention. The above examples, embodiments, instructions semantics, and drawings should not be deemed to be the only embodiments, and are presented to illustrate the flexibility and advantages of the present invention as defined by the following claims:

The invention claimed is:

1. A 3-dimensional (3D) precast locating system for identifying and tracking 3D location, that includes ground elevation and geographical location, of a precast, wherein the system comprises:
   a radio frequency identifier (RFID) tag embedded within the precast;
   a precast lifting machinery having a hook for lifting the precast, wherein a 3D location of the lifting machinery is predetermined as a reference;
   a radio frequency identifier (RFID) reader attached to the lifting machinery for identifying the precast by operationally reading the RFID tag of the lifted precast;
   a sensor assembly for detecting an instant 3D location of the hook with reference to the predetermined 3D location of the lifting machinery; and
   a position translational controller for holding the predetermined 3D location of the lifting machinery, the position translational controller is operable to derive an instant 3D location of the lifted precast based on the 3D location of the hook detected by the sensor assembly, with reference to the predetermined 3D location of the lifting machinery.

2. The 3-dimensional (3D) precast locating system according to claim 1, wherein the sensor assembly further measures the load state of the hook.

3. The 3-dimensional (3D) precast locating system according to claim 1, wherein the lifting machinery is a tower crane.

4. The 3-dimensional (3D) precast locating system according to claim 3, wherein the tower crane comprises a mast and a horizontal jib, wherein the hook of the lifting machineries is disposed along the length of the horizontal jib, wherein the instant 3D location of the hook is determined based on distance and ground elevation of the hook on the horizontal jib with reference to the mast.

5. The 3-dimensional (3D) precast locating system according to claim 4, wherein the horizontal jib is slewable about the mast and the sensor assembly measures slewing angle of the horizontal jib with reference to the mast.

6. The 3-dimensional (3D) precast locating system according to claim 4, wherein the horizontal jib is luffable about the mast and the sensor assembly measures luffing angle of the horizontal jib.

7. The 3-dimensional (3D) precast locating system according to claim 4, wherein the hook is attached to the horizontal jib by a trolley, wherein the trolley is movably slideable along the horizontal jib, thereby shifting the hook laterally along the horizontal jib.

8. The 3-dimensional (3D) precast locating system according to claim 4, wherein the mast of the tower crane is fixed on its base to the ground.

9. The 3-dimensional (3D) precast locating system according to claim 4, wherein the tower crane is a traveling tower crane.

10. The 3-dimensional (3D) precast locating system according to claim 9, wherein a boogie having wheels is provided on the base of the traveling tower crane, thereby allowing the tower crane to travel along a track.

11. The 3-dimensional (3D) precast locating system according to claim 10, wherein rotation of the wheels of the boogie is used to determine the 3D location of the traveling tower crane.

12. The 3-dimensional (3D) precast locating system according to claim 10, wherein a differential global positioning system is installed to the lifting machinery, the differential global positioning system used to determine the 3D location of the traveling tower crane.

13. The 3-dimensional (3D) precast locating system according to claim 1, wherein the position translational controller is attached onto top of the lifting machinery.

14. The 3-dimensional (3D) precast locating system according to claim 1, further comprises a communication link operable for transmitting the instant 3D location of the lifted precast to a server.

15. The 3-dimensional (3D) precast locating system according to claim 13, wherein when the communication link is out of range of the server, the communication link is operable to transfer instant 3D location of the lifted precast to other communication links connected to the server.

16. A method for identifying and tracking 3D location, that includes ground elevation and geographical location, of precast, wherein the method comprises:
   embedding a radio frequency identifier (RFID) tag within the precast;
   lifting the precast using a precast lifting machinery having a hook, wherein a 3D location of the lifting machinery is pre-determined;
   reading the RFID tag embedded of the lifted precast for identifying the lifted precast;
   detecting an instant 3D location of the hook with reference to the predetermined 3D location of the lifting machinery; and
   deriving an instant 3D location of the lifted precast based on the 3D location of the hook with reference to the predetermined 3D location of the lifting machinery.

17. The method of claim 16, further comprises transmitting the instant 3D location of the lifted precast to a server.

18. The method of claim 17, further comprises transmitting the instant 3D location of the lifted precast to other communication links connected more closely to the server.

19. The method according to claim 17, further comprises storing the instant 3D location and the identity of the lifted precast in a memory provided in the server.

20. The method according to claim 17, further comprises displaying the instant 3D location and the identity of the lifted precast in a user interface connected to the server.

21. The method according to claim 16, wherein deriving an instant 3D location of the lifted precast based on the 3D location of the hook with reference to the predetermined 3D location of the lifting machinery further comprises attaching a position translational controller performing the derivation to top part of the lifting machinery.

22. The method according to claim 16, further comprises determining the 3D location of the lifting machinery.

* * * * *